March 3, 1959     W. E. GREENAWALT     2,876,092
SMELTING FINELY DIVIDED IRON ORE
Filed Sept. 27, 1956
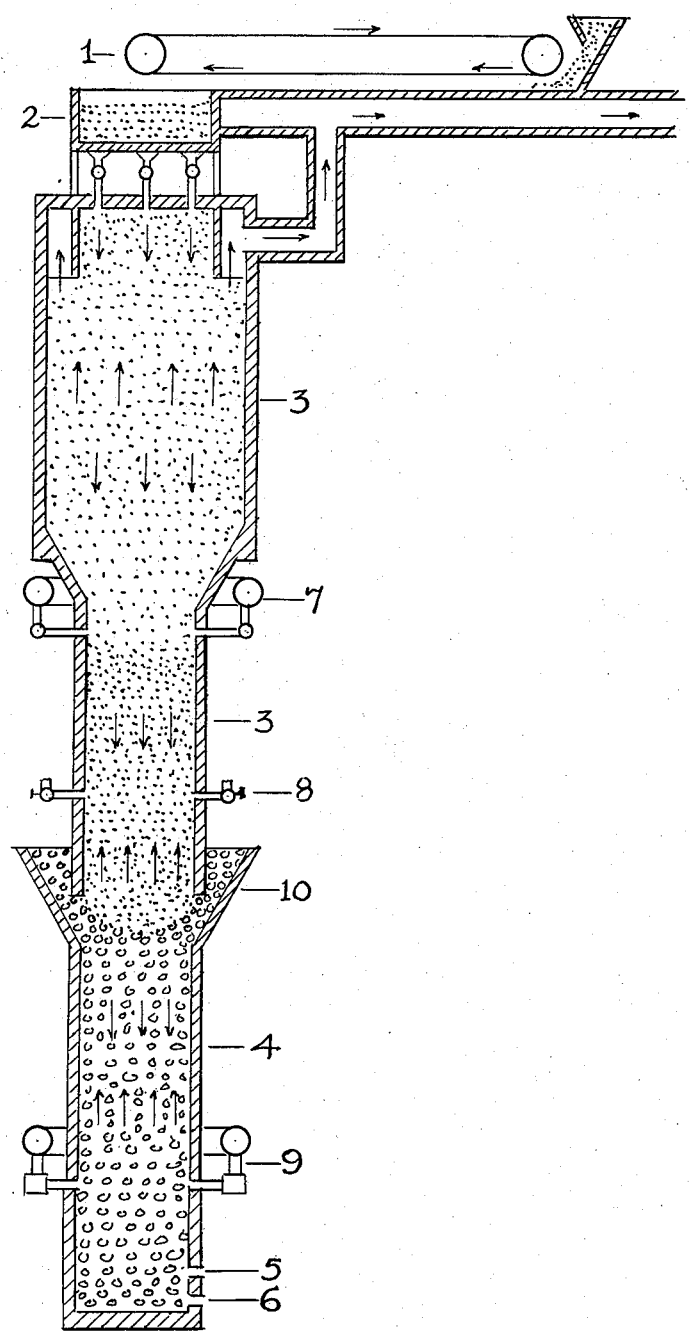
INVENTOR.
William E. Greenawalt

2,876,092
SMELTING FINELY DIVIDED IRON ORE

William E. Greenawalt, Denver, Colo.

Application September 27, 1956, Serial No. 612,494

11 Claims. (Cl. 75—40)

My invention relates to smelting finely divided iron ore, principally obtained from milling ore too low in grade to be advantageously smelted direct.

Iron ore concentrate, usually obtained by gravity, flotation, or magnetic separation of finely ground low grade ore is ordinarily obtained by repeated fine grinding, and prepared for blast furnace smelting by pelletizing and sintering, which converts it into semifused lumps. This is done by mixing the finely ground ore concentrate with about ten percent water and several percent of fine coke, igniting the charge, and passing a blast of air downwardly through the porous mixture. The ore, in sintering, is heated to about 2100 deg. F., after which it is cooled to atmospheric temperature of about 65 deg. F. When the cold sinter is charged into the blast furnace it has to be reheated through the sintering temperature of about 2100 deg. F. to the smelting temperature of 2800 to 3000 deg. F. This involves a heavy expense of both installation and operation. It is evident that if direct smelting of the fine concentrate could be sufficiently cheapened it would be practical to economize in the milling by avoiding very fine grinding, and dispense with pelletizing and sintering to put the concentrate into shape for regular blast furnace smelting.

It has been repeatedly proposed to get these results by showering the finely ground concentrate through a highly heated reducing atmosphere of a vertical shaft smelting furnace, but the difficulties involved have not met with encouraging results in practical operation.

The object of my process is to cheapen the milling and avoid sintering, by smelting the finely ground ore direct into pig iron.

The process will be described by referring to the accompanying drawing, which represents it in longitudinal section in diagramatic form. In operating the process the finely ground ore concentrate is dried in the drier 1, and delivered into the hopper 2, from which it is fed in continuous subdivided streams into the highly heated oxidizing atmosphere of the upper section of the melting furnace 3 in the upper part of the vertical shaft, then through the highly heated reducing atmosphere in the lower section of the melting furnace 3 to melt it; and delivering the molten ore from the melting furnace 3, separated from the melting furnace gas, into a highly heated column of carbon, usually in lump form, in the smelting furnace 4 in the lower part of the vertical shaft, where the smelting is completed to produce pig iron and slag. The slag flows out through the slag hole 5, and the iron through the tap hole 6.

Fluid heating agents are introduced into the oxidizing section of the melting furnace by means of the burners 7, and fluid reducing agents through the injectors 8. Air is delivered into the carbon in the smelting furnace through the tuyers 9; and carbon is delivered into the smelting furnace through the feeders 10, intermediate the melting and smelting furnaces.

Most of the fuel required for smelting is that necessary to raise the temperature of the ore from about 65 deg. F. to about 2300 degrees in the oxidizing section of the melting furnace. It will usually be advantageous to adjust both the height and the sectional area of the oxidizing section of the melting furnace to get the best results in conformity with the nature of the ore. This can readily be done because there is no weight of ore to support in the melting furnace, and the construction is simple. It permits of a melting furnace of large volume in the oxidizing section of the melting furnace, which may be diminished in the reducing section. Such an arrangement gives ample time for the finer particles of ore to be melted in the oxidizing section of the melting furnace; and sufficient time to reduce them in the reducing section. It would also result in minimizing the dust problem, which of course will be less for a slow movement of the melting furnace gas than for a fast movement. It would also result in instantly fusing the finest dust particles, because they would assume a dense spherical form and settle more readily than the same unfused particles.

The showered ore delivered from the oxidizing section of the melting furnace into the reducing section, freed from oxidizing influences, requires only a small additional amount of heat and reducing agent to maintain the reducing temperature of the showered ore in the reducing section and at the same time reduce the finest part of the iron oxide ore to metallic iron. The reduction in the reducing section of the melting furnace is made with cheap reducing agents, such powdered coal, fuel oil, or natural gas, as compared with the expensive coke necessary in heating and smelting iron ore in regular blast furnace practice.

The mixture of reduced dust and unreduced coarse ore molten particles, at a temperature of about 2300 deg. F., is delivered in showered form from the reducing section of the melting furnace into the highly heated column of carbon in the smelting furnace, where the smelting is completed to produce pig iron and slag.

In showering the ore through the vertical shaft, as described, the coarser ore particles fed into the melting furnace descend through the hottest part of both the melting and the smelting furnace. There is nothing to interfere with the safe operation of the process, even if some of the coarsest ore particles are so coarse as to remain unmolten on being delivered into the highly heated coke in the smelting furnace, where they will be quickly melted.

There is an important relation between the milling and the smelting. If, for example, the ore is ground to 20 mesh, only about 12% would be the full 20 mesh size; 25% would be between 40 and 60 mesh; 23% would be between 60 and 100 mesh; and 40% would be over 100 mesh. The 63% of the ore finer than 60 mesh would be instantly melted in the highly heated oxidizing atmosphere of the melting furnace and instantly reduced in the highly heated reducing atmosphere. The molten ore delivered in showered form from the melting furnace into the highly heated column of carbon in the smelting furnace would then consist of 63% of the ore in a molten and reduced condition, and 37% unreduced ore, at about the melting temperature of 2200 deg. F. The only coke consumed in the smelting furnace would be that required to raise the temperature of the molten ore from about 2300 deg. F. to the smelting temperature of 2800 to 3000 degrees, and provide the carbon for the reducing reactions. By regulating the temperature and the height of the melting furnace it would be practical to smelt ore ground no finer than 10 or 12 mesh, which implies an appreciable saving in milling.

The smelting furnace acts as a medium to reduce the unreduced ore and to slag the impurities of all of it. The temperature of the carbon at the top of the smelting furnace may be kept as high as desired above the melting point of the molten ore, and may be varied to conform with the amount of the unreduced coarse ore delivered into it from the melting furnace. It serves as a fire box for the smelting furnace, into which the molten ore in showered form is delivered, freed from the melting furnace gas, direct into the fire. This implies a highly heated and highly concentrated exhaust smelting furnace gas, containing a high percentage of CO. Only a small amount of reducing agent need be added to the smelting exhaust gas to control the reducing action on the finest ore particles in the reducing section of the melting furnace. The grinding mesh in the mill will be largely determined by it.

The coke consumed in the process is used to better advantage than in regular blast furnace smelting. The blast furnace reactions may be represented by the equations:

$$3C + Fe_2O_3 = Fe + 3CO$$
$$3CO + Fe_2O_3 = Fe + 3CO_2$$
$$CO_2 + C = 2CO$$

The conversion of inert $CO_2$ to the active CO depends largely on the temperature and the concentration of the gas. This reaction is promoted to its highest efficiency in the smelting furnace charged with highly heated coke, and supplied with molten ore at a temperature of about 2300 deg. F.

The amount of gas issuing from the smelting furnace is very small and contains a high percentage of CO. It flows in a uniformly distributed stream into the reducing section of the melting furnace, where the CO is burned to furnish heat for melting the ore. The hot gas issuing from the melting furnace devoid of combustible elements is used to dry or heat fresh ore.

It should be noted that the atmosphere in the upper section 3 of the melting furnace may be oxidizing or reducing without necessarily being reducing to iron oxide. The highly heated and concentrated reducing gas from the lower section of the melting furnace 3 flows into the upper section where the carbon monoxide may be oxidized, or burned, to heat and melt the ore. The atmosphere in the upper section 3 of the melting furnace may be oxidizing to carbon monoxide, but non-reducing to iron oxide. Reduction of iron oxide requires a high heat and concentrated reducing agent, as provided for in part in the lower section of the melting furnace, and completed in the smelting furnace.

This application is an improvement and a continuation-in-part of my co-pending application, Serial No. 502,969, filed April 21, 1955.

I claim:

1. A process of smelting finely divided iron oxide ore comprising, showering the ore through a highly heated oxidizing atmosphere and then through a highly heated reducing atmosphere of a melting furnace in the upper part of a vertical shaft to melt it, and to produce a mixture of reduced and unreduced molten ore delivering the mixture of reduced and unreduced molten ore in showered form, separated from the melting furnace gas, into a highly heated permeable column of carbon in lump form in a smelting furnace in the lower part of the vertical shaft to complete the reduction of the iron oxide to metallic iron and slag impurities, passing the resulting smelting furnace gas into and through the showered ore in the melting furnace, and separating the molten iron from the molten slag.

2. A process of smelting finely divided iron oxide ore comprising, showering the ore through a highly heated oxidizing atmosphere and then through a highly heated reducing atmosphere in a melting furnace in the upper part of a vertical shaft to melt it, and to produce a mixture of reduced and unreduced molten ore delivering the mixture of reduced and unreduced molten ore in showered form, separated from the melting furnace gas, into a highly heated column of carbon in a smelting furnace in the lower part of the vertical shaft to complete the reduction of the iron oxide to metallic iron and slag impurities, injecting air into the column of carbon in the smelting furnace, passing the resulting smelting furnace gas into and through the showered ore in the melting furnace, and separating the molten iron from the molten slag.

3. A process of smelting finely divided iron oxide ore comprising, showering the ore through a highly heated oxidizing atmosphere and then through a highly heated reducing atmosphere in a melting furnace in the upper part of a vertical shaft to melt it, and to produce a mixture of reduced and unreduced molten ore passing the mixture of reduced and unreduced molten ore in showered form, separated from the melting furnace gas, through a highly heated permeable column of carbon in lump form in a smelting furnace in the lower part of the vertical shaft to complete the reduction of the iron ore into metallic iron and slag impurities, passing the resulting smelting furnace gas into and through the showered ore in the melting furnace, delivering the carbon into the vertical shaft intermediate the melting furnace and the smelting furnace, and separating the molten iron from the molten slag.

4. A process of smelting finely divided iron oxide ore comprising, showering the ore through the highly heated oxidixing atmosphere and then through a highly heated reducing atmosphere in a melting furnace in the upper part of a vertical shaft to melt it, and to produce a mixture of reduced and unreduced molten ore delivering the mixture of reduced and unreduced molten ore in showered form into a highly heated column of carbon in a smelting furnace in the lower part of the vertical shaft to complete the reduction of the iron ore into metallic iron and slag impurities, injecting air into the column of carbon in the smelting furnace, passing the resulting hot smelting furnace gas through the showered ore in the highly heated reducing atmosphere of the melting furnace to reduce the finer particles of the oxide ore into metallic, then passing the resulting gas into and through the showered ore in the highly heated oxidizing atmosphere of the melting furnace to burn its combustible elements and melt the ore.

5. A process of smelting finely divided iron oxide ore comprising, showering the ore through a highly heated oxidizing atmosphere and then through a highly heated reducing atmosphere of a melting furnace in the upper part of a vertical shaft to melt it, and to produce a mixture of reduced and unreduced molten ore delivering the mixture of reduced and unreduced ore, separated from the melting furnace gas, into a highly heated permeable column of carbon in lump form in a smelting furnace in the lower part of the vertical shaft to complete the reduction of the iron oxide to metallic iron and slag impurities, withdrawing the resulting hot reducing gas from the smelting furnace, injecting a reducing agent into the withdrawn smelting furnace gas, passing the resulting mixture of smelting furnace gas and reducing agent through the showered ore in the reducing section of the melting furnace, then passing it through the showered ore in the oxidizing section of the melting furnace, and separating the molten iron from the molten slag.

6. A process of smelting finely divided iron oxide ore comprising, showering the ore through a highly heated oxidizing atmosphere and then through a highly heated reducing atmosphere of a melting furnace to melt it, and to produce a mixture of reduced and unreduced molten ore delivering the mixture of reduced and unreduced molten ore, separated from the melting furnace gas, into a highly heated permeable column of lump material in the presence of a reducing agent in a smelting furnace to complete the reduction of the iron oxide to metallic iron and slag impurities, passing the resulting smelting furnace gas into and through the showered ore in the melting furnace, and separating the molten iron from the molten slag.

7. A process of smelting finely divided iron oxide ore comprising, showering the ore through a highly heated oxidizing atmosphere and then through a highly heated reducing atmosphere of a melting furnace in the upper part of a vertical shaft to melt it and to produce a mixture of reduced and unreduced molten ore, delivering the mixture of reduced and unreduced molten ore in showered form, separated from the melting furnace gas, into a mass of highly heated carbon in a smelting furnace in the lower part of the vertical shaft to complete the reduction of the iron oxide to metallic iron and slag impurities, injecting a reducing agent into the hot exhaust smelting furnace gas, passing the resulting mixture of hot smelting furnace gas and reducing agent through the showered ore in the reducing section of the melting furnace and delivering it into the showered ore in the oxidizing section of the melting furnace, and separating the molten ore from the molten slag.

8. A process of smelting finely divided iron oxide ore comprising, showering the ore through the highly heated atmosphere in the upper section of a vertical shaft to melt it and to produce a mixture of reduced and unreduced molten ore, separating the melting furnace gas from the molten ore, then delivering the mixture of reduced and unreduced molten ore in showered form into a highly heated permeable column of carbon in lump form in the smelting furnace in the lower section of the vertical shaft to complete the reduction of the iron oxide to metallic iron and slag, and separating the molten iron from the molten slag.

9. A process of smelting finely divided iron oxide ore comprising, showering the ore through the highly heated atmosphere in the upper section of a vertical shaft to melt it and to produce a mixture of reduced and unreduced molten ore, separating the melting furnace gas from the mixture of reduced and unreduced molten ore, then delivering the mixture of reduced and unreduced molten ore in showered form into a highly heated permeable column of carbon in lump form in the smelting furnace in the lower section of the vertical shaft to complete the reduction of the iron oxide into metallic iron and slag, passing the resulting hot exhaust gas from the smelting furnace consisting largely of carbon monoxide into the showered ore in the upper section of the vertical shaft, and separating the molten iron from the molten slag.

10. A process of smelting finely divided iron oxide ore comprising, showering the ore through the highly heated atmosphere in the upper section of a vertical shaft to melt it and to produce a mixture of reduced and unreduced molten ore, separating the melting furnace gas from the molten ore, then delivering the mixture of reduced and unreduced molten ore in showered form into a highly heated permeable column of lump material in the presence of a reducing agent in the smelting furnace in the lower section of the vertical shaft to complete the reduction of the iron oxide to metallic iron and slag, injecting air into the column of permeable lump material in the smelting furnace to maintain the charge at the reacting temperature, and passing the hot exhaust gas from the smelting furnace into the showered ore in the upper section of the vertical shaft.

11. A process of smelting finely divided iron oxide ore comprising, showering the ore through the highly heated atmosphere of a melting furnace in the upper part of a vertical shaft to melt it and to produce a mixture of reduced and unreduced molten ore, then delivering the mixture of reduced and unreduced molten ore in showered form into a highly heated permeable column of lump material in the presence of a reducing agent in the smelting furnace in the lower part of the vertical shaft to complete the reduction of the iron oxide to metallic iron and slag, separating the molten iron from the molten slag, and passing the exhaust gas from the smelting furnace into and through the showered ore in the melting furnace.

References Cited in the file of this patent

UNITED STATES PATENTS

| 57,969 | Reese | Sept. 11, 1866 |
| 2,321,310 | Moore | June 8, 1943 |
| 2,784,077 | Greenawalt | Mar. 5, 1957 |